United States Patent [19]
Hwang

[11] Patent Number: 5,879,244
[45] Date of Patent: Mar. 9, 1999

[54] GOLF BALL

[75] Inventor: In Hong Hwang, Seoul, Rep. of Korea

[73] Assignee: Ilya Co. Ltd., Seoul, Rep. of Korea

[21] Appl. No.: 835,765

[22] Filed: Apr. 8, 1997

[30] Foreign Application Priority Data

Dec. 10, 1996 [KR] Rep. of Korea ........................ 96-63436

[51] Int. Cl.$^6$ ............................ A63B 37/06; A63B 37/12
[52] U.S. Cl. .......................... 473/373; 473/376; 473/377; 473/378; 524/408
[58] Field of Search .................................... 473/372, 359, 473/373, 378, 374, 376, 377, 371

[56] References Cited

U.S. PATENT DOCUMENTS 4,056,269 11/1977 Pollitt et al. ............................ 473/372
4,264,075 4/1981 Miller et al. ............................ 473/372

*Primary Examiner*—George J. Marlo
*Attorney, Agent, or Firm*—Amster, Rothstein & Ebenstein

[57] ABSTRACT

A golf ball made by adding bismuth, bismuth alloy or a mixture of bismuth alloy in bismuth to the resin compositions in amounts of 0.5–60 parts by weight per 100 parts by weight of the base resin of the said golf ball, which the carry extends farther than the other common golf balls without raising a hardness. It is because, as molding the said golf ball with the resin compositions which is added bismuth or bismuth alloy, cooling the moldings at a normal temperature after molding, bismuth or bismuth alloy gets solidified and expanded its volume by 3–3.5% and the organic polymeric materials grow dense as much as bismuth expands, that hold a lot of energy. Additionally, since this can be applied to all the core and the cover or selectively to each part, it is possible to make the golf balls with various properties that may give a satisfaction to all sorts of golfers. Furthermore, the golf balls according to the present invention is soft to the touch, which has a good hit feeling.

48 Claims, 2 Drawing Sheets

3-piece solid Golf Ball
Structure(DualCore+OneCover)

2-piece solid Golf Ball
Structure(OneCore+OneCover)

3-piece solid Golf Ball
Structure(OneCore+DoubleCover)

1-piece solid Golf Ball
Structure(Single)

4-piece solid Golf Ball
Structure(DualCore+DoubleCover)

4-piece solid Golf Ball
Structure(OneCore+TripleCover)

GOLF BALL

FIELD OF THE INVENTION

The present invention relates to a golf ball which is the density of organic polymeric materials being higher than they have in nature, by adding bismuth, bismuth alloy or mixture of bismuth alloy in bismuth, having higher coefficient of resilience than common golf balls and keeping its spin property, that can remarkably extend its carry.

BACKGROUND OF THE INVENTION

In general, a good golf ball is the one with the property of proper spin and longer carry, but it is usual that if a common ball has a good property of spin, the carry therefore gets shorter, or on the contrary, if a common ball has a good property of carry, but it turned out to have a poor property of spin. These problems are caused by raising the hardness of core in solid type golf ball to obtain high initial velocity or by raising the compression strenth of the golf ball simply to obtain high resilient force in order to extend the carry. Thus, the present invention is to solve the problems and provide a golf ball has a higher resilience than common golf balls and a good property of spin by adding bismuth or bismuth alloy which occurs its volume expansion by 3–3.5% in solidifying after molding and the organic polymeric materials grow dense as much as bismuth expands, that can remarkably extend its carry.

DESCRIPTION OF THE MAIN PARTS IN DRAWINGS

Figure 1:
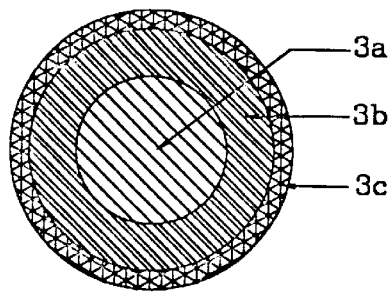
FIG. 1 is a sectional view of the golf ball with a cover covering dual core which is composed of an inner core circumscribed by an outer layer in Three Piece Solid Golf Ball in which bismuth, bismuth alloy or mixture of bismuth alloy in bismuth is added in accordance with the present invention.

In FIG. 1 $3a$ is inner core, $3b$ is outer layer, $3c$ is cover.

Figure 2:
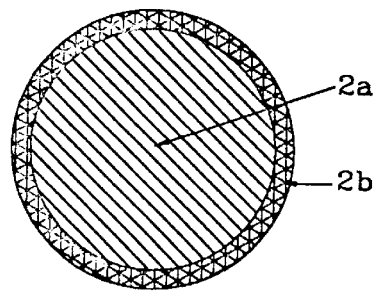
FIG. 2 is a sectional view of the golf ball with a cover covering a core in Two Piece Solid Golf Ball in which bismuth, bismuth alloy or mixture of bismuth alloy in bismuth is added in accordance with the present invention.

In FIG. 2 $2a$ is core, $2b$ is cover.

Figure 3:
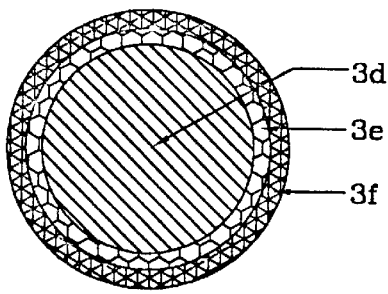
FIG. 3 is a sectional view of the golf ball with double cover which is composed of an inner cover circumscribed by an outer cover, covering a core in Three Piece Solid Golf Ball in which bismuth, bismuth alloy or mixture of bismuth alloy in bismuth is added in accordance with the present invention.

In FIG. 3 $3d$ is core, $3e$ is inner cover, $3f$ is outer cover.

Figure 4:
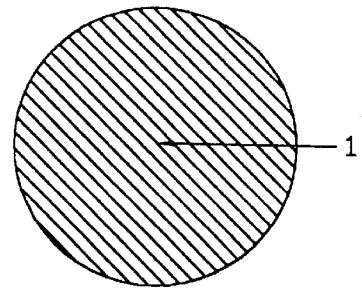
FIG. 4 is a sectional view of the golf ball has a simple structure as One Piece Solid Golf Ball in which bismuth, bismuth alloy or mixture of bismuth alloy in bismuth is added in accordance with the present invention.

In FIG. 4 1 is a golf ball in single structure.

Figure 5:
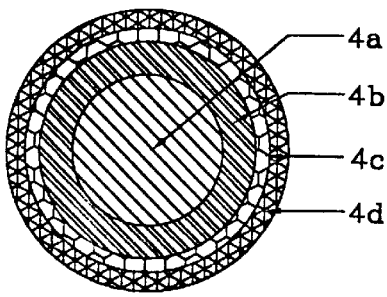
FIG. 5 is a sectional view of the golf ball with double cover which is composed of an inner cover circumscribed by an outer cover, covering dual core composed of an inner core circumscribed by an outer layer in Four Piece Solid Golf Ball in which bismuth, bismuth alloy or mixture of bismuth alloy in bismuth is added in accordance with the present invention.

In FIG. 5 $4a$ is inner core, $4b$ is outer layer, $4c$ is inner cover, $4d$ is outer cover.

Figure 6:
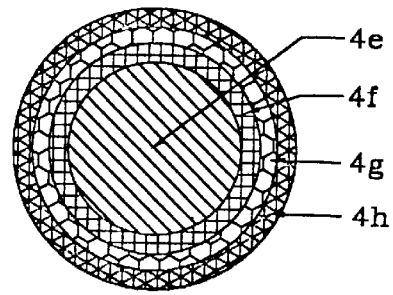
FIG. 6 is a sectional view of the golf ball with triple cover which is composed of an inner cover, middle and outer cover that covering a core in Four Piece Solid Golf Ball in which bismuth, bismuth alloy or mixture of bismuth alloy in bismuth is added in accordance with the present invention.

In FIG. 6 $4e$ is core, $4f$ is inner cover, $4g$ is middle cover, $4h$ is outer cover.

Figure 7:
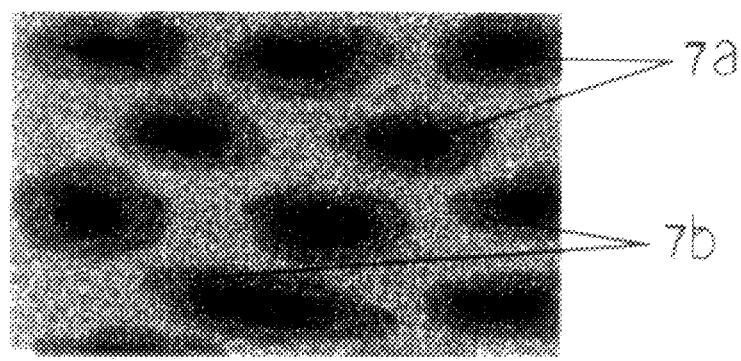
FIG. 7 is a sectional view of the mold, showing the form of bismuth or bismuth alloy which is surrounded by the organic polymeric materials, growing dense by the expansion of volume of the bismuth or bismuth alloy after compression molding.

In FIG. 7 $7a$ is the powdery grains of bismuth or bismuth alloy (it is represented in deep black), $7b$ is the organic polymeric materials that surround the bismuth or bismuth alloy, growing dense (it is represented in dark grey).

Figure 8:
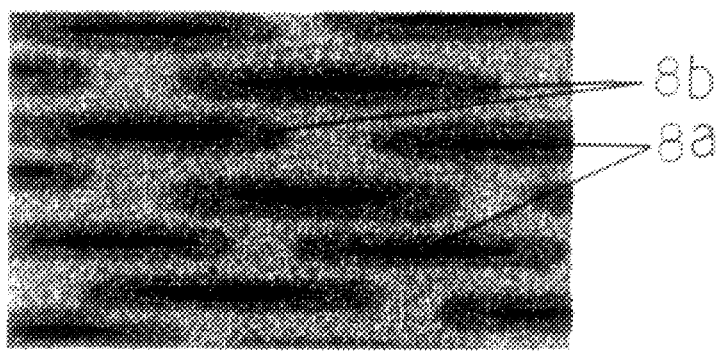
FIG. 8 is a sectional view of the mold, showing the elongated form of bismuth or bismuth alloy which is surrounded by the organic polymeric materials, growing dense by the expansion of volume of the bismuth or bismuth alloy after injection molding.

In FIG. 8 $8a$ is the elongated form of bismuth or bismuth alloy (it is represented in deep black), $8b$ is the organic polymeric materials that surround the bismuth or bismuth alloy, growing dense (it is represented in dark grey).

DETAILED DESCRIPTION OF THE INVENTION

Generally, the core includes dual core, being formed of rubber compositions based on polybutadiene rubber with high resilience property and containing an unsaturated carboxylic acid or its metallic salt as a co-crosslinking agent and various inorganic or organic filler to adjust the weight of core and adding organic peroxides as a reacting initiator, and then vulcanizing and molding the rubber compositions by a heating, pressing and shaping under specified time, temperature and pressure. And, the cover includes double cover, being formed of thermoplastic resin compositions based on ionomer resin and white pigment to whiten and other fillers in some cases. Sometimes, according to the kind of golf balls, other resins are used as main material replace ionomer resin such as polyurethane resin, rubber, and other thermoplastic resins, or the resins mentioned above can be used in a mixture. That cover is made by molding the said materials over the prepared core under the specified temperature, time and pressure. However, as the general method of extending the carry, unsaturated carboxylic acid or its metallic salt used as a co-crosslinking agent to make the core is excessively added to raise the hardness of core, even if the hardness will grow high, the core may be hard to play and the property of spin and feeling may get worse as a result. On the contrary, if unsaturated carboxylic acid or its metallic salt is added in lesser amounts, the core becomes soft and the striking feel can improve, but the expected hardness cannot be attained and the carry also may get too short. Additionally, in case of raising the compression strength on the golf ball, which is made from hard core and hard cover, the ball becomes hard to hit and the spin property get worse. On the contrary, in case of the golf ball with cover in soft resin, the striking feel and the spin property will be improved, but the carry shortens and its value as goods become lowered by the surface of cover is easy to get damaged in hitting.

Thus, to cope with the problems mentioned above, the inventor does get to make an invention to keep proper spin and extend the carry as follows. Firstly, the main materials for making the core of present invention (designating respectively dual core 3a and 3b in FIG. 1, core 2a in FIG. 2, core 3d in FIG. 3, a core and also golf ball 1 in FIG. 4, dual core 4a and 4b in FIG. 5, core 4e in FIG. 6. Hereinafter referred as core.) are such as rubber, co-crosslinking agent, filler, bismuth, bismuth alloy, anti-oxidant and reacting initiator, among which the rubber good for use is cis-1,4-polybutadiene and also proper mixture of other rubbers such as isoprene rubber, natural rubber and S.B.R. in some cases. As a co-crosslinking agent, α,β-ethylenical unsaturated carboxylic acid or its metallic salt is good for use and other acrylates such as trimethylol propane trimethacrylate, urethane acrylate, epoxy acrylate can be used in proper mixture in some case. α,β-ethylenical unsaturated carboxylic acid good for use is acrylic acid, methacrylic acid, of which the metallic salts are zinc diacrylate, zinc dimethacrylate, etc., and these co-crosslinking agents are blended in amounts of 25–50 parts by weight per 100 parts by weight of the base rubber. As a filler, metallic oxides such as zinc oxide, lead oxide and iron oxide and other inorganics such as barium sulfate, silica, calcium carbonate and glass fiber are used, among which, if using acrylic acid, methacrylic acid, zinc diacrylate, zinc dimethacrylate as a co-closslinking agent, zinc oxide is good in particular and can be used in mixing with other specific filler. The quantity of filler to use, which is fixed in due consideration of the specific gravity and hardness of each core, is not limited in general. It is practically used in amounts of 1–50 parts by weight per 100 parts by weight of the base rubber. As a anti-oxidant, 2,2'-methylene bis(4-ethyl-6-tert.-butyl phenol) is commonly used, the quantity is 0.5–1.5 parts by weight per 100 parts by weight of the base rubber. As a reacting initiator, organic peroxides such as dicumyl peroxide, n-butyl-4,4'-bis(t.-butyl peroxy)-valerate, bis(t.-butyl peroxy isopropyl) benzene, 1,1'-bis(t.-butyl peroxy)-3,3,5-trimethyl cyclohexane, etc. are commonly used. The quantity of this reacting initiator is used in amounts of 0.5–5 parts by weight per 100 parts by weight of the base rubber. If necessary, an auxiliary coagent of reacting initiator like n,n-m-phenylene dimaleimide can be used as a coagent. Meanwhile bismuth, the point of present invention, is a silver-grey colored metal of an atomic number 83 with symbol of Bi which is practically used in powdery grain of the size passable through 200 to 400 mesh sieve (about 40–75 μm). It is possible to use the lump of bismuth milled in the same size as mentioned. Since bismuth is fragile at room temperature by nature, easy to break, and possible to make a molding by a proper molding method at about 220° C. Furthermore, bismuth is easy to make an alloy with various kind of metals such as alkali metals, mercury, tin, antimony, cadmium, lead, germanium, copper, silver, gold, platinum group, nickel, etc., among which the alloy of lead, copper, and tin with a low melting point is suitable for the present invention. It is desirable that the volume of bismuth amounts to 55% and over in bismuth alloy. Bismuth or bismuth alloy has a distinguished property that there occurs its volume expansion by 3–3.5% in solidifying The inventor would apply this peculiar phenomenon to golf ball making. It has in common to use bismuth or bismuth alloy in amounts of 0.5–60 parts by weight per 100 parts by weight of the base rubber and it may be good to use only bismuth, only bismuth alloy or a mixture of bismuth alloy in bismuth

[Hereinafter, the terms of bismuth, bismuth alloy and the mixture of bismuth alloy in bismuth described in this text will be mentioned just as bismuth. And so forth.]

For making the aforesaid core according to the present invention, it is to go through the processes to mix well the referred materials with common mixing instruments such as kneader, banbury mixer, two-roll mill, etc., fill a specific-sized mold with them and perform molding under specified time, pressure and temperature. There are several molding methods such as compression molding, injection molding and others, among which compression molding or injection molding is a good for the preferred embodiment.

In molding a core, it is usual to occur the crosslinking of the rubber with co-crosslinking agent by heat and the reacting initiator, if the temperature condition adjusted properly, the fine grains of bismuth which is affected by the evaporating gas of co-crosslinking agent in part, may be under melting. Bismuth under melting is not so voluminous as that at the normal temperature, while the organic polymeric materials like rubbers rapidly expand to the same volume as the shrinkage of bismuth. But if the expansion it too large to make the size of mold, that can be prevented by applying a higher pressure to the mold. And continued the molding for a proper time, and cooling the mold, the molding as a core gets to cause the expanded rubbers to reshrink and their molecules to be dense accordingly. As shown in FIG. 7 or FIG. 8, the grains of bismuth or bismuth alloy (7a in FIG. 7, 8a in FIG. 8) mixed in composites of core get solidified and, on the contrary, expansion of bismuth or bismuth alloy occured by 3–3.5% to make organic polymeric materials grow dense as much as bismuth expands as 7b in FIG. 7 and 8b in FIG. 8, and the core hold a lot of energy as a result. The golf ball with this core holding further energy than other common golf balls, gets to make its carry much farther in hitting. Additionally, this core has no difference in a hardness from common golf balls without bismuth in the same composition. Accordingly, since there is no need to use excessively co-crosslinking agent for increasing in carry, it is possible to make a soft golf ball which has a good hit feeling and a good spin property. In case the core using bismuth as described above is applied to a golf ball, 3-piece solid golf ball in FIG. 1 can be made with all inner core (3a) and outer layer (3b) of dual core having bismuth or with inner core (3a) in common composition except bismuth and outer layer (3b) having bismuth or, in some cases, with outer layer (3b) in common composition except bismuth and inner core (3a) having bismuth. 4-piece solid golf ball in FIG. 5 also can be made with all inner core (4a) and outer layer (4b) of dual core having bismuth or with inner core (4a) in common composition except bismuth and outer layer (4b) having bismuth and, in some cases, with outer layer (4b) in common composition except bismuth and inner core (4a) having bismuth.

Meanwhile, as the main materials for making the cover of present invention (designating respectively cover 3c in FIG. 1, cover 2b in FIG. 2, inner cover 3e and outer cover 3f in FIG. 3, inner cover 4c and outer cover 4d in FIG. 5, inner cover 4f, middle cover 4g and outer cover 4h in FIG. 6. Hereinafter referred as cover.) are organic polymeric material, pigment, filler and bismuth which is the point of the present invention. The organic polymeric materials are ionomer resin, polyurethane resin, thermoplastic polyester resin, rubber and other thermoplastic resin, used alone or a mixture of more than two kinds, among which the ionomer resin is the one that unsaturated mono- or di-carboxylic acid having 3 to 8 carbon atoms in mono-olefin and matters having some ester thereof are partly or all neutralized by mono- or di-valent metals. At present, an ionomer resin named Surlyn of Dupon't is in the most general use for a golf ball cover. There are many resins with various properties according to the constituent molecules, reaction and the molecular weights in making an ionomer resin, kinds of metal used in neutralizing and differences in neutralization are on the market, among which the one with Shore D Hardness 38–70 and Flexural Modulus 250–600 MPa is proper for the present invention. Ionomer resin may be used alone or a mixture more than two kinds thereof. As a polyurethane resin, such as ester type, ether type and ether ester copolymer type polyurethane, polyurethane elastomer made by polymerizing polyol, diisocyanate or poly isocyanate and chain extender or, by making polyol and poly isocyanate separately, 2-component type polyurethane to use in a mixture when molding cover later on. Polyurethane resin with Specific Gravity 1.15–1.25, Shore D Hardness 35–65 and Tensile Strength 350–600 Kg/Cm$^2$ is proper for the present invention. The said polyurethane resin can be used alone or a mixture of more than two kinds thereof. As a thermoplastic polyetherester resin, block copolymer type composed of polybutylene terephthalate as a hard segment and polyether glycol as a soft segment, with Shore D Hardness 30–60 and Flexural Modulus 1,000–2,000 Kg/Cm$^2$ is proper for the present invention. The said polyetherester resin can be used alone or a mixture of more than two kinds thereof. Rubber as a main material for the cover, hardened by a properly co-crosslinking agent to the rubber which is a polyisoprene or a polybutadiene, can be used alone or a mixture of more than two kinds thereof. There is no specific restriction in use of resins, that many kinds of resins besides the aforementioned resins can be used for the present invention. The main materials which is the above mentioned resins can be used alone or a proper mixture of various resins. As a white pigment, titanium dioxide is proper and may be mixed with barium sulfate in some cases, which is used in amounts of 2–5 parts by weight per 100 parts by weight of the base resin for the said cover. And some blue pigments, violet pigments or whiteness increasing agent can be added for whitening further. In some cases, heavy metals or metallic oxides as a filler to weight the cover can be used in amounts of 5–50 parts by weight per 100 parts by weight of the base resin. Meanwhile, bismuth, the point of the present invention, is the same thing as described earlier in the parts about the core and is used in amounts of 0.5–60 parts by weight per 100 parts by weight of the base resin. For making the cover according to the present invention, it is to go through the process to mix and extrude well the aforesaid materials for the cover in an extruder, make them in a proper size for use with a pelletizer and then cover the said core through the injection molding or compression molding. Then, there occurs the same phenomenon as described earlier in the parts about the core, that cooling of the moldings at the normal temperature gets to cause the polymeric matters in materials for cover to shrink, but bismuth is solidifying and expand its volume by 3–3.5%, with the result that the polymeric matters grow dense as much as the bismuth expands and hold a lot of energy. Furthermore, in case of the method of injection molding, bismuth grains finely elongated at high temperature, come to be mixed well with the resins and injected to the mold by high injection pressure, and after cooling at the normal temperature, with the result that polymeric matters around bismuth grains as shown in FIG. 8 become more dense in wide area as 8*b* in FIG. 8 and hold further energy.

In case the cover using bismuth as described above is applied to a golf ball, 3-piece solid golf ball in FIG. 3 can be made with all inner cover (3*e*) and outer cover (3*f*) of double cover having bismuth or with inner cover (3*e*) having bismuth and outer cover (3*f*) in common composition except bismuth, or, in some cases, with inner cover (3*e*) in common composition except bismuth and outer cover (3*f*) having bismuth. 4-piece solid golf ball in FIG. 5 also can be made with all inner cover (4*c*) and outer cover (4*d*) of double cover having bismuth or with inner cover (4*c*) having bismuth and outer cover (4*d*) in common composition except bismuth or, in some cases, with inner cover (4*c*) in common composition except bismuth and outer cover (4*d*) having bismuth. And, 4-piece solid golf ball shown in FIG. 6 can be made with all inner cover (4*f*), middle cover (4*g*), outer cover (4*h*) of triple cover having bismuth or with inner cover (4*f*) and middle cover (4*g*) having bismuth and outer cover (4*h*) in common composition except bismuth or, in some cases, with inner cover (4*f*) in common composition except bismuth and middle cover (4*g*) and outer cover (4*h*) having bismuth, or with inner cover (4*f*) and outer cover (4*h*) having bismuth and middle cover (4*g*) in common composition except bismuth.

A golf ball with the core and cover which contains bismuth according to the present invention as mentioned above, though using the same polymer materials as other common golf balls, the polymer materials become dense between its molecules to hold a lot of energy, with the result that the said golf ball can make its carry farther without a falling-off in spin property remarkably different from others. Furthermore, since there is no need to use excessively co-crosslinking agent added for raising the hardness or compression strength in making the core and also no need to use a hard material for cover as the case of other common golf balls, it is possible to make a soft golf ball with a good hit feeling. And a golf ball can be made with the core having bismuth and the cover in common composition except bismuth, and it can be made in the other way. Additionally, if varying the way to apply bismuth to each part of the multilayer golf balls such as 3-piece solid golf balls and 4-piece solid golf balls, its effect become diversified, so that it is possible to make golf balls with various properties for all sorts of golfers.

EXAMPLES

The following Examples and Comparative Examples further illustrate the present invention in detail but are not to be construed to limit the scope thereof.

Examples 1–6 and Comparative Examples 1–6

Core Making

First, after mixing well the compositions shown on Table 1 in a kneader for half an hour, it is need to mill them finely on a two-roll mill for 15 min. and preformed it in a proper size, and heated up the form in a mold at 170° C. for 20 min., vulcanized and hardened them, so as to make each core in FIG. 2, FIG. 3, FIG. 4, FIG. 6. In the same way, after mixing well the compositions shown on Table 1 in a kneader for half an hour, it is need to mill them finely on a two-roll mill for 15 min. and preformed it in a proper size, and heated up the form in a mold at 170° C. for 15 min., vulcanized and hardened them, so as to make each inner core in FIG. 1 and FIG. 5, and also in the same way, the compositions shown on Table 1 of the outer layer of the dual core are milled well on a two-roll mill, in a proper size, and premolded it to form hemispherical halfshells in a proper mold at 100° C. for 10 min., and the said inner core is covered with these two hemispherical halfshells, and heated up the products in a mold at 170° C. for 15 min. vulcanized and hardened them, so as to make dual cores in FIG. 1 and FIG. 5. It is notable to use bismuth with more than 99% purity and passable through 300 mesh sieve in size, and bismuth alloy composed of 65% bismuth and 35% lead and passable through 300 mesh sieve in size. All the mixture quantity of the compositions shown on Table 1 are the parts by weight.

Cover and Golf Ball Making

After extruding the compositions shown on Table 1 in a extruder at 190°–220° C. and pelletizing it to form pellets in a proper size, drying the pellets beforehand at 60° C. for 20 hours, and made a golf ball of the present invention by covering the said dual core FIG. 1 and the core in FIG. 2 with the pellets of the compositions by using a injection molding machine. And, in the same way, using the pellets in the compositions shown on Table 1 and covering the core in FIG. 3, dual core in FIG. 5 and core in FIG. 6 as a inner cover by using a injection molding machine, and made a golf ball with double cover in FIG. 3 and FIG. 5 and with triple cover in FIG. 6 by covering successively in the same way with the compositions shown on Table 1. It is notable to use bismuth with more than 99% purity and passable through 300 mesh sieve in size, and bismuth alloy composed of 65% bismuth and 35% lead and passable through 300 mesh sieve in size. All the mixture quantity of the compositions shown on Table 1 are the parts by weight. Meanwhile, a golf ball with the compositions shown on Table 2 is made as a comparative examples to appraise comparatively in the same method as the aforesaid examples, and all the mixture quantity of the referred compositions are the parts by weight. Additionally, there are seen on Table 3 the result of comparative appraisal as the characters of golf balls from examples of Table 1 and comparative examples of Table 2. It is notable that, by adding a filler to the cores on Table 2 to get the weight of all golf balls on Table 2 similar to that on Table 1, and the weight of all golf balls is adjusted by 45.1–45.5 gr.

TABLE 1

|  |  | (Examples) | | | | | |
| --- | --- | --- | --- | --- | --- | --- | --- |
|  | Ingredient | 1 | 2 | 3 | 4 one piece | 5 | 6 |
| Inner core (Core) | Cis-1,4-polybutadiene rubber | 100 | 100 | 100 | 100 | 100 | 100 |
|  | 2,2'-methylene bis(4-ethyl -6-t.-butyl phenol) | 0.5 | 0.5 | 0.5 | 0.5 | 0.5 | 0.5 |
|  | Zinc oxide | 5.0 | 5.0 | 5.0 | 5.0 | 5.0 | 5.0 |
|  | Zinc diacrylate | 30.0 | 32.0 | 30.0 | 32.0 | 30.0 | 30.0 |
|  | Bismuth |  | 11.0 |  |  |  |  |
|  | Bismuth-Lead alloy |  |  |  | 10.0 |  |  |
|  | Dicumyl peroxide 40% | 3.0 | 3.0 | 3.0 | 3.0 | 3.0 | 3.0 |
| Outer layer | Cis-1,4-polybutadiene rubber | 100 |  |  |  | 100 |  |
|  | 2,2'-methylene bis(4-ethyl -6-t.-butyl phenol) | 0.5 |  |  |  | 0.5 |  |
|  | Zinc oxide | 5.0 |  |  |  | 5.0 |  |
|  | Zinc diacrylate | 29.5 |  |  |  | 29.0 |  |
|  | Bismuth | 17.0 |  |  |  | 15.5 |  |
|  | Bismuth-Lead alloy |  |  |  |  |  |  |
|  | Dicumyl peroxide 40% | 3.0 |  |  |  | 3.0 |  |
| Inner cover | Pandex T-R3080 (brand name of polyurethane resin) |  |  | 100 | 100 |  |  |
|  | Surlyn#8320(brand name of ionomer resin) |  |  |  |  |  | 100 |
|  | Titanium dioxide (rutile type) |  |  | 3.0 | 3.0 |  | 3.0 |
|  | Bismuth |  |  | 22.5 | 20.5 |  |  |
|  | Bismuth-Lead alloy |  |  |  |  |  | 15.0 |
| Middle cover | Pandex T-R3080 (brand name of polyurethane resin) |  |  |  |  |  | 100 |
|  | Surlyn#8320(brand name of ionomer resin) |  |  |  |  |  |  |
|  | Titanium dioxide (rutile type) |  |  |  |  |  | 3.0 |
|  | Bismuth |  |  |  |  |  | 23.0 |
|  | Bismuth-Lead alloy |  |  |  |  |  |  |
| Outer cover | Surlyn#8940(brand name of ionomer resin) | 50.0 | 50.0 | 50.0 |  | 50.0 | 20.0 |
|  | Surlyn#9910(brand name of ionomer resin) | 50.0 | 50.0 | 50.0 |  | 50.0 | 50.0 |
|  | Surlyn#8320(brand name of ionomer resin) |  |  |  |  |  | 30.0 |
|  | Titanium dioxide (rutile type) | 3.0 | 3.0 | 3.0 |  | 3.0 | 3.0 |
|  | Bismuth |  |  | 8.0 |  |  |  |
|  | Bismuth-Lead alloy |  |  |  |  |  |  |

TABLE 2

| | Ingredient | (Comparative Examples) | | | | | |
|---|---|---|---|---|---|---|---|
| | | 1 | 2 | 3 | 4 one piece | 5 | 6 |
| Inner core (Core) | Cis-1,4-polybutadiene rubber | 100 | 100 | 100 | 100 | 100 | 100 |
| | 2,2'-methylene bis(4-ethyl -6-t.-butyl phenol) | 0.5 | 0.5 | 0.5 | 0.5 | 0.5 | 0.5 |
| | Zinc oxide | 5.0 | 17.0 | 17.5 | 12.0 | 12.0 | 25.0 |
| | Zinc diacrylate | 30.0 | 32.0 | 30.0 | 32.0 | 30.0 | 30.0 |
| | Dicumyl peroxide 40% | 3.0 | 3.0 | 3.0 | 3.0 | 3.0 | 3.0 |
| Outer layer | Cis-1,4-polybutadiene rubber | 100 | | | | 100 | |
| | 2,2'-methylene bis(4-ethyl -6-t.-butyl phenol) | 0.5 | | | | 0.5 | |
| | Zinc oxide | 23.0 | | | | 20.0 | |
| | Zinc diacrylate | 29.5 | | | | 29.0 | |
| | Dicumyl peroxide 40% | 3.0 | | | | 3.0 | |
| Inner cover | Pandex T-R3080 (brand name of polyurethane resin) | | | 100 | | 100 | |
| | Surlyn#8320(brand name of ionomer resin) | | | | | | 100 |
| | Titanium dioxide (rutile type) | | | 3.0 | | 3.0 | 3.0 |
| Middle cover | Pandex T-R3080 (brand name of polyurethane resin) | | | | | | 100 |
| | Surlyn#8320(brand name of ionomer resin) | | | | | | |
| | Titanium dioxide (rutile type) | | | | | | 3.0 |
| Outer cover | Surlyn#8940(brand name of ionomer resin) | 50.0 | 50.0 | 50.0 | | 50.0 | 20.0 |
| | Surlyn#9910(brand name of ionomer resin) | 50.0 | 50.0 | 50.0 | | 50.0 | 50.0 |
| | Surlyn#8320(brand name of ionomer resin) | | | | | | 30.0 |
| | Titanium dioxide (rutile type) | 3.0 | 3.0 | 3.0 | | 3.0 | 3.0 |

TABLE 3

| | (Comparative appraisal of properties) | | | | | | | | | | | |
|---|---|---|---|---|---|---|---|---|---|---|---|---|
| | Examples | | | | | | Comparative Examples | | | | | |
| | 1 | 2 | 3 | 4 | 5 | 6 | 1 | 2 | 3 | 4 | 5 | 6 |
| ATTI Compression (*1) | 96 | 101 | 92 | 88 | 94 | 99 | 98 | 103 | 93 | 89 | 96 | 101 |
| Shore D Hardness of core surface (*2) | 42 | 45 | 43 | 45 | 42 | 44 | 44 | 47 | 45 | 46 | 44 | 45 |
| Shore D Hardness of outer cover surface (*3) | 64 | 64 | 64 | | 64 | 60 | 64 | 64 | 64 | | 64 | 60 |
| Initial Velocity (ft/sec) (*4) | 252 | 254 | 252 | 251 | 252 | 253 | 252 | 254 | 252 | 250 | 252 | 253 |
| Initial Spin of Iron #5 (rpm) (*5) | 6120 | 5980 | 6270 | 6240 | 6290 | 6070 | 5870 | 5730 | 5990 | 6110 | 5980 | 5820 |
| Carry of Driver #1 (yard) (*6) | 233 | 230 | 235 | 220 | 238 | 236 | 229 | 225 | 230 | 216 | 234 | 233 |
| Hit Feeling (*7) | ○ | Δ | ◎ | ◎ | ◎ | Δ | Δ | X | ○ | ○ | ○ | X |

(*1) Numeric values obtained with Compression Tester made by ATTI Co. in U.S.A., showing a compression strength of the golf balls, that the higher valued one is relatively harder.
(*2) Test method of German Industrial Standard DIN 53505 with a Hardness measuring instrument made by Zwick Co. in Germany, measuring a Hardness of outer surface of the core(dual core), that the higher valued one is relatively with a high Hardness.
(*3) Same method and instrument as used in (*2), measuring a Hardness of outer cover surface of the golf balls.
(*4) Initial Velocity of the golf balls just hitted at a head speed of 143.8 ft/sec. with a Driver in 10.5° loft angle of Iron Byron(brand name), mechanical golfer made by True Temper Sports Co. in U.S.A..
(*5) Values calculated in terms of rpm(revolution per minute) through test photographing the revolution of the golf balls just hitting at a head speed of 130 ft/sec. with a #5 Iron by the same mechanical golfer as stated in (*4).
(*6) Carry of the golf balls just hitted at a head speed of 143.8 ft/sec. with a driver in 10.5° loft angle of the same mechanical golfer as stated in (*4).
(*7) Appraisal of the golf balls through the golfers with average less than 80 who have practically rounded the course, which represents as ◎Excellent ○Good ΔNormal XBad As shown on Table 3, the golf ball used bismuth or bismuth alloy according to the present invention is the superior one with soft feel not only which has a good spin property but also of which the carry can be extended in comparison with other common golf balls, though both the said one and others made by use of the same polymeric matters.

What is claimed is:

1. A solid golf ball comprising at least one resin composition, and as chemically unreacted filler a bismuth ingredient selected from the group consisting of bismuth, bismuth alloy and combinations thereof, in amounts of 0.5–60% by weight of said resin composition, said bismuth ingredient being characterized by an expansion of 3–3.5% in passing from a molten state to a solid state.

2. The golf ball of claim 1, comprising a core and a cover covering said core.

3. The golf ball of claim 2, which applies to all the core and the cover of a two piece solid golf ball in the structure of one core and one cover.

4. The golf ball of claim 2, which applies only to the core, not to the cover, of a two piece solid golf ball in the structure of one core and one cover.

5. The golf ball of claim 2, which applies only to the cover, not to the core, of a two piece solid golf ball in the structure of one core and one cover.

6. The golf ball of claim 2, which applies to all the inner core, the outer layer and the cover, of a three piece solid golf ball in the structure of dual core and one cover.

7. The golf ball of claim 2, which applies only to the inner core, not to the outer layer and the cover, of a three piece solid golf ball in the structure of dual core and one cover.

8. The golf ball of claim 2, which applies only to the inner core and the outer layer, not to the cover, of a three piece solid golf ball in the structure of dual core and one cover.

9. The golf ball of claim 2, which applies only to the inner core and the cover, not to the outer layer, of a three piece solid golf ball in the structure of dual core and one cover.

10. The golf ball of claim 2, which applies only to the outer layer, not to the inner core and the cover, of a three piece solid golf ball in the structure of dual core and one cover.

11. The golf ball of claim 2, which applies only to the outer layer and the cover, not to the inner core, of a three piece solid golf ball in the structure of dual core and one cover.

12. The golf ball of claim 2, which applies only to the cover, not to the inner core and the outer layer, of a three piece solid golf ball in the structure of dual core and one cover.

13. The golf ball of claim 2, which applies to all the core, and the inner cover and the outer cover, of a three piece solid golf ball in the structure of one core and double cover.

14. The golf ball of claim 2, which applies only to the core, not to the inner cover and the outer cover, of a three piece solid golf ball in the structure of one core and double cover.

15. The golf ball of claim 2, which applies only to the core and the inner cover, not to the outer cover, of a three piece solid golf ball in the structure of one core and double cover.

16. The golf ball of claim 2, which applies only to the core and the outer cover, not to the inner cover, of a three piece solid golf ball in the structure of one core and double cover.

17. The golf ball of claim 2, which applies only to the inner cover, not to the core and the outer cover, of a three piece solid golf ball in the structure of one core and double cover.

18. The golf ball of claim 2, which applies only to the inner cover and the outer cover, not to the core, of a three piece solid golf ball in the structure of one core and double cover.

19. The golf ball of claim 2, which applies only to the outer cover, not to the core and the inner cover, of a three piece solid golf ball in the structure of one core and double cover.

20. The golf ball of claim 2, which applies to all the inner core, the outer layer, the inner cover and the outer cover, of a four piece solid golf ball in the structure of dual core and double cover.

21. The golf ball of claim 2, which applies only to the inner core, not to the outer layer and the inner cover and the outer cover, of a four piece solid golf ball in the structure of dual core and double cover.

22. The golf ball of claim 2, which applies only to the inner core and the outer layer, not to the inner cover and the outer cover, of a four piece solid golf ball in the structure of dual core and double cover.

23. The golf ball of claim 2, which applies only to the inner core and the outer layer and the inner cover, not to the outer cover, of a four piece solid golf ball in the structure of dual core and double cover.

24. The golf ball of claim 2, which applies only to the inner core and the inner cover, not to the outer layer and the outer cover, of a four piece solid golf ball in the structure of dual core and double cover.

25. The golf ball of claim 2, which applies only to the inner core and the outer cover, not to the outer layer and the inner cover, of a four piece solid golf ball in the structure of dual core and double cover.

26. The golf ball of claim 2, which applies only to the inner core and the outer layer and the outer cover, not to the inner cover, of a four piece solid golf ball in the structure of dual core and double cover.

27. The golf ball of claim 2, which applies only to the outer layer, not to the inner core and the inner cover and the outer cover, of a four piece solid golf ball in the structure of dual core and double cover.

28. The golf ball of claim 2, which applies only to the outer layer and the inner cover, not to the inner core and the outer cover, of a four piece solid golf ball in the structure of dual core and double cover.

29. The golf ball of claim 2, which applies only to the outer layer and the inner cover and the outer cover, not to the inner core, of a four piece solid golf ball in the structure of dual core and double cover.

30. The golf ball of claim 2, which applies only to the outer layer and the outer cover, not to the inner core and the inner cover, of a four piece solid golf ball in the structure of dual core and double cover.

31. The golf ball of claim 2, which applies only to the inner cover, not to the inner core and the outer layer and the outer cover, of a four piece solid golf ball in the structure of dual core and double cover.

32. The golf ball of claim 2, which applies only to the inner cover and the outer cover, not to the inner core and the outer layer, of a four piece solid golf ball in the structure of dual core and double cover.

33. The golf ball of claim 2, which applies only to the outer cover, not to the inner core and the outer layer and the inner cover, of a four piece solid golf ball in the structure of dual core and double cover.

34. The golf ball of claim 2, which applies to all the core, the inner cover, the middle cover and the outer cover of a four piece solid golf ball in the structure of one core and triple cover.

35. The golf ball of claim 2, which applies only to the core, not to the inner cover and the middle cover and the outer cover, of a four piece solid golf ball in the structure of one core and triple cover.

36. The golf ball of claim 2, which applies only to the core and the inner cover, not to the middle cover and the outer cover, of a four piece solid golf ball in the structure of one core and triple cover.

37. The golf ball of claim 2, which applies only to the core and the inner cover and the middle cover, not to the outer cover, of a four piece solid golf ball in the structure of one core and triple cover.

38. The golf ball of claim 2, which applies only to the core and the middle cover, not to the inner cover and the outer cover, of a four piece solid golf ball in the structure of one core and triple cover.

39. The golf ball of claim 2, which applies only to the core and the middle cover and the outer cover, not to the inner cover, of a four piece solid golf ball in the structure of one core and triple cover.

40. The golf ball of claim 2, which applies only to the core and the outer cover, not to the inner cover and the middle cover, of a four piece solid golf ball in the structure of one core and triple cover.

41. The golf ball of claim 2, which applies only to the inner cover, not to the core and the middle cover and the outer cover, of a four piece solid golf ball in the structure of one core and triple cover.

42. The golf ball of claim 2, which applies only to the inner cover and the middle cover, not to the core and the outer cover, of a four piece solid golf ball in the structure of one core and triple cover.

43. The golf ball of claim 2, which applies only to the inner cover and the middle cover and the outer cover, not to the core, of a four piece solid golf ball in the structure of one core and triple cover.

44. The golf ball of claim 2, which applies only to the inner cover and the outer cover, not to the core and the middle cover, of a four piece solid golf ball in the structure of one core and triple cover.

45. The golf ball of claim 2, which applies only to the middle cover, not to the core and the inner cover and the outer cover, of a four piece solid golf ball in the structure of one core and triple cover.

46. The golf ball of claim 2, which applies only to the middle cover and the outer cover, not to the core and the inner cover, of a four piece solid golf ball in the structure of one core and triple cover.

47. The golf ball of claim 2, which applies only to the outer cover, not to the core and the inner cover and the middle cover, of a four piece solid golf ball in the structure of one core and triple cover.

48. The solid golf ball of claim 2, formed at least in part by solidification of a molten mixture of said at least one resin composition and said bismuth ingredient.

\* \* \* \* \*